(12) United States Patent
Johnson et al.

(10) Patent No.: US 11,296,936 B2
(45) Date of Patent: Apr. 5, 2022

(54) NETWORK ELEMENT ASSOCIATION USING NETWORK DATA

(71) Applicant: T-Mobile USA, Inc., Bellevue, WA (US)

(72) Inventors: Eric Johnson, Bothell, WA (US); Gregory Grieco, Buda, TX (US); Carl Brown, Kent, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 168 days.

(21) Appl. No.: 16/784,150

(22) Filed: Feb. 6, 2020

(65) Prior Publication Data

US 2021/0250230 A1    Aug. 12, 2021

(51) Int. Cl.
| | |
|---|---|
| *H04L 41/0806* | (2022.01) |
| *H01Q 3/00* | (2006.01) |
| *H01Q 3/02* | (2006.01) |
| *H04L 41/0816* | (2022.01) |
| *H04W 84/04* | (2009.01) |
| *H04W 84/18* | (2009.01) |

(52) U.S. Cl.
CPC ......... *H04L 41/0806* (2013.01); *H01Q 3/005* (2013.01); *H01Q 3/02* (2013.01); *H04L 41/0816* (2013.01); *H04W 84/042* (2013.01); *H04W 84/18* (2013.01)

(58) Field of Classification Search
CPC . H04L 41/0806; H04L 41/0816; H01Q 3/005; H01Q 3/02; H04W 84/042; H04W 84/18; H04W 24/04; H04W 24/02
See application file for complete search history.

(56) References Cited

U.S. PATENT DOCUMENTS

| | | |
|---|---|---|
| 8,971,302 B2 | 3/2015 | Lee et al. |
| 2013/0242736 A1 | 9/2013 | Tarraf et al. |
| 2015/0189550 A1 | 7/2015 | Harrang |
| 2016/0135067 A1 | 5/2016 | Morad et al. |
| 2016/0165462 A1 | 6/2016 | Tan et al. |

FOREIGN PATENT DOCUMENTS

EP    3225046 B1    11/2019

OTHER PUBLICATIONS

European Patent Application No. 21150389.1, Extended European Search Report dated Jun. 23, 2021, 15 pages.

*Primary Examiner* — Walter J Divito
(74) *Attorney, Agent, or Firm* — Han Santos, PLLC

(57) ABSTRACT

Methods for configuring a self-organizing network (SON) of a cellular telecommunication network are disclosed. A first set of data comprised of substantially real-time data for one or more key performance indicators (KPIs) is collected. A characteristic profile of the KPIs is determined. An instruction is sent to an identifier associated with the selected adjustable antenna, indicative of a command to change an electromagnetic characteristic of the selected adjustable antenna. A second set of data for the KPIs is received, and an updated profile of the KPIs is determined. A statistical probability of a causal relationship between the updated profile and the change to the electromagnetic is determined based on a predetermined threshold. Identifiers for the adjustable antennas are updated or confirmed.

20 Claims, 5 Drawing Sheets

NETWORK ELEMENT ASSOCIATION USING NETWORK DATA

BACKGROUND

Wireless telecommunication networks have evolved into complex systems that include various hardware that is often controlled with complex software via a central station. To accommodate the increasing demand of such wireless services, large scale wireless telecommunication networks often include an increasing number of cell sites, sometimes referred to as base stations, which are used to service mobile devices in various locations.

Characteristics of antennas at base stations, such as the electrical downtilts, may be remotely changed. An actuator may be coupled to some antennas that are referred to as a Remote Electrical Tilt (RET). The RET may be remotely controlled by a central controller to electrically tilt an antenna using the RET.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
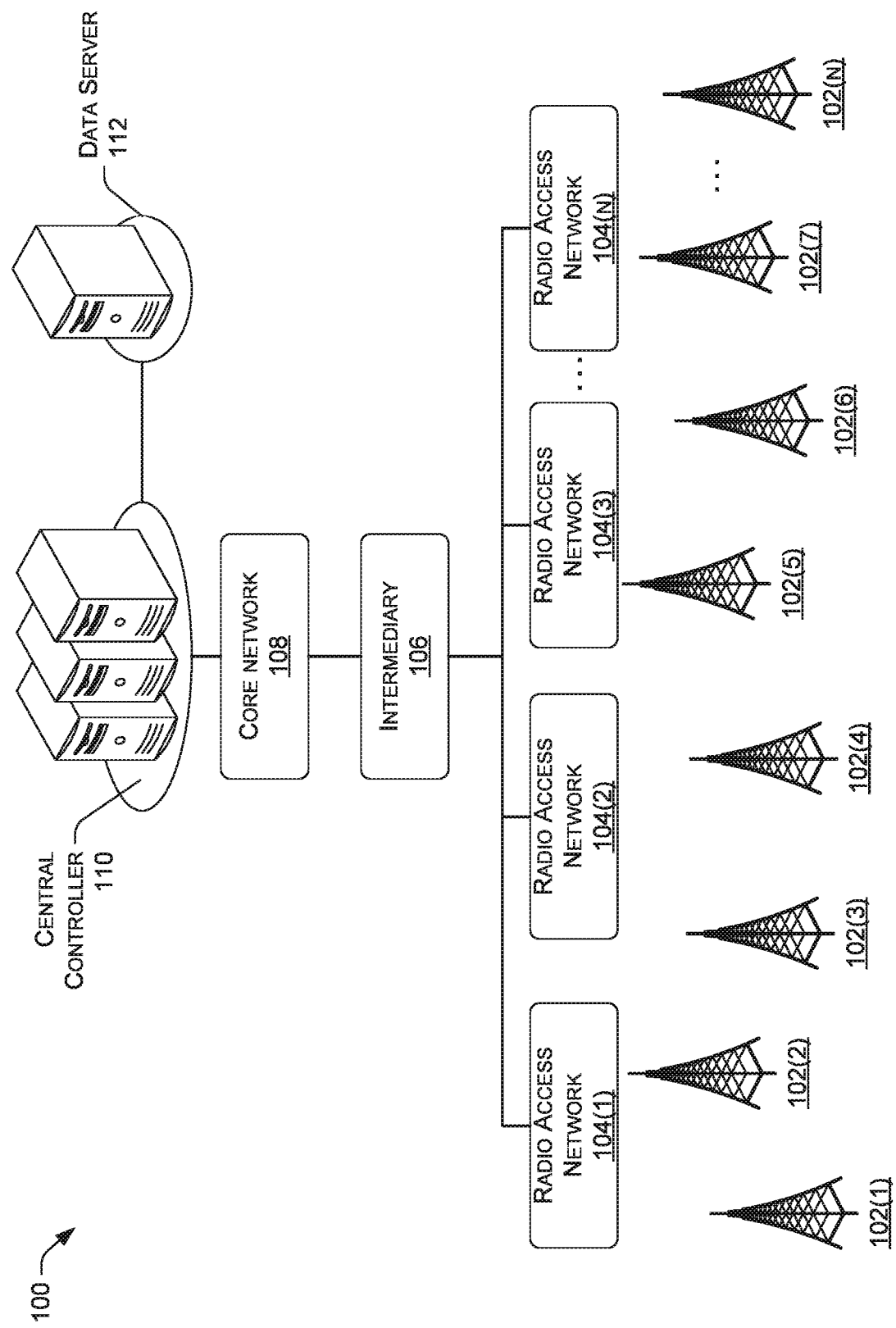
FIG. 1 is an example architecture for implementing a wireless network system.

Various components of a wireless telecommunication network may be controlled to effect changes in RF characteristics, frequency allocations, and the like. Characteristics of antennas at base stations may be remotely changed by a network management controller or function. For example, a RET that is coupled to an antenna may be remotely controlled by a central controller to electrically tilt the antenna. However, the network may not have a logical connection between the RET and the cell site where the antenna is coupled. In some implementations, a label may be populated for the RET that indicates the associated cell. The labelling scheme may accommodate the fact that multiple cells can be controlled by the same RET, or multiple RETs can control one cell.

One challenge is that the RET label may be blank or populated with a label that maps it to an incorrect cell(s). For example, RET labels are typically manually populated during a new site integration or reconfiguration. This manual input may be prone to error, resulting in RET label issues that are manifested in the network. Therefore, it may be possible that a controller at the network sends a command intended to implement the RET associated with antenna A, whereas due to an incorrect label, the command actually implements the RET for antenna B. If the RET label is blank, then the RET cannot be correlated to any cell, and any cell(s) that would be associated with the RET may not be tilted.

While it may be possible to manually update the RET labels, the process may be time intensive due to the effort required to analyze data from the network configuration or site documentation, or to manually perform the RET tilt-to-cell analysis. When RET labels are incorrect, the network may not be able to make adjustments that can improve the network performance, which in turn may affect the user experience. Some networks implement an automated configuration scheme. For example, some networks may implement a self-organizing network or self-optimizing network (SON) to automate aspects of the configuration, management, optimization and healing of the network. While the SON may attempt to check if a RET label matches the correct naming standard, there may be no means available for the SON to determine if the labels actually correspond to valid cells in the network. Some implementations may incorporate functionality to correlate RET labels to cells in order to implement tilts. While this may allow for determining whether cells actually correspond to real cells in the network, the correct label for a cell cannot be identified if the label does not match a valid cell.

The disclosure describes various ways to identify incorrect or missing RET labels using various network information. The incorrect or missing RET labels may be corrected, thus enabling more efficient modification and improvement of network performance, for example in systems employing a SON or other methods for automatically reconfiguring a network. The disclosed technologies represent a substantial advantage over existing systems where incorrect or missing RET labels prevent or mitigate efficient modification and improvement of network performance, or where attempts are made to manually identify whether a RET tilt was correctly executed. These shortcomings may exacerbate network resource issues including the overuse of network and computing resources. It can be appreciated, therefore, that the disclosed technologies represent a substantial advance toward reducing the waste of processor and network usage associated with providing applications and functions in networks such as a mobile communications network.

Various embodiments are disclosed for populating a blank RET label or correcting associations between cell(s) and RETs. In one embodiment, a central controller may initiate a command to implement a RET, and multiple network metrics may be collected and analyzed to determine which cells were associated with a significant characteristic change after the RET was changed. In some embodiments, Key Performance Indicators (KPIs) may be collected and analyzed. The KPIs may be associated with cells on the cell site of interest or may be system or network wide KPIs. For example, a KPI that measures the distance of traffic from the cell site (i.e., from User Equipment (UE) connected to the cell site) may provide a statistically indicative measure of change due to a RET tilt. Example KPIs may include, for Long-Term Evolution (LTE) implementations, Average UE Distance (based on Timing Advance); for Universal Mobile Telecommunications Service (UMTS) implementations, the PRACH Propagation Distance (based on PRACH Propagation Delay); for Global System for Mobile Communications (GSM) implementations, the Average Timing Advance.

In some embodiments, the tilt changes may be performed during low traffic times to minimize the impact on users. In one embodiment, a RET near its maximum tilt may be up-tilted (i.e., tilt decreased), causing the Average UE Distance to increase, and a RET near its minimum tilt may be down-tilted (i.e., tilt increased) causing the Average UE Distance to decrease. The RET Label may be updated with the correct naming convention that associates the Label with the cells where a significant change resulted from the RET tilt. The change may be determined based on a predetermined threshold or some other numerical or statistical limit.

In some embodiments, one or more algorithms may be implemented to determine significant changes in Average UE Distance from a RET tilt change. In one example, the median and standard deviation may be used. In other embodiments, other methods may be used to determine correlations between observed data and adjusted antennas.

In some embodiments, the Average UE Distance (based on Timing Advance) may be used to identify traffic changes related to the antenna tilt changes. In one example, it can be determined if cell by cell coverage is observed as becoming weaker or stronger during a predetermined time period. Down-tilting the RET (i.e., increasing the RET tilt) may cause coverage to become weaker or lost, and up-tilting the RET (i.e., decreasing the RET tilt) may cause the coverage to become stronger or overshoot its intended coverage area, thereby causing interference.

In some embodiments, digital twinning may be used to complement KPI analysis and provide an additional basis for determining whether a RET tilt has the expected network impact. A digital twin may be a digital replica or virtual prototype of the network that can be run in parallel with the physical network. The network model may be updated with corrected RET labels as they are identified. When a RET is tilted, the corresponding change may be executed in the digital twin and an expected change in network conditions may be simulated. This may be compared to actual KPI data collected from the network. Disparities between the simulated and observed data may indicate a mismatch between the RET labeling in the digital twin and the physical network.

The correction of RET labels allows network operators to optimize the antenna electrical tilts to improve coverage and reduce interference, thus improving data throughput and call quality. The correction of RET labels further allows a SON controller to improve network performance based on changing RETs. For example, the SON controller may automatically change tilts on RETs to improve coverage and reduce interference. The SON controller may also automatically change the tilts on RETs to fill in coverage holes during a network outage from events such as a storm or natural disaster. Such changes may be automatically implemented and thus save many hours of manual engineering effort, but they cannot be used unless the RET label is populated and corresponds to the correct cell(s). The techniques described herein may be implemented in a number of ways. Example implementations are provided below with reference to the following figures.

FIG. 1 is an example architecture for implementing a wireless network system in accordance with the disclosed embodiments. Cell sites 102(1) to 102(N) may be configured and managed by a central controller 110. The cell sites may be configured individually or by clusters. The wireless telecommunication network 100 may include a plurality of hardware, software, and other infrastructure components that may be typical of a large wireless telecommunications provider. The cell sites 102(1) to 102(N) may be associated with a radio access networks (RANs) 104(1) to 104(N) used for mobile communications. The cell sites 102(1) to 102(N) may be located across different geographic areas to facilitate providing network access and connectivity to users in their corresponding geographic area. The cell sites 102(1) to 102(N) may be base stations, or other network end points (or possibly intermediary points) that exchange communications with user devices, such as mobile telecommunication devices, computing devices, or other devices that have wireless connectivity. The RANs 104 may be in communication with a core network 108 directly or through one or more intermediaries 106, depending on the size and complexity of the wireless telecommunication network 100. The intermediaries 106 may include includes one or more control nodes (e.g., the mobility management entity (MME)).

In accordance with one or more embodiments, the wireless telecommunication network 100 may conform to Universal Mobile Telecommunications System (UMTS) technologies that employ UMTS Terrestrial Radio Access Network (UTRAN). In some instances, the UTRAN may share a several components like a Circuit Switch (CS) and a Packet Switch (PS) core network with a GSM EDGE Radio Access Network (GERAN) (Global System for Mobile Communications (GSM), Enhanced Data rates for GSM Evolution (EDGE)). In various instances, a 4G long term evolution (4G/LTE) network that comprises Evolved UMTS Terrestrial Radio Access Network (EUTRAN) may be employed to transmit data for the telecommunications networks, besides UMTS or GSM. Thus, EUTRAN, UTRAN and GERAN networks (and other possible RANs) may coexist to process telecommunications traffic.

In some instances, communications may be handed off between EUTRAN, UTRAN and GERAN networks (or other networks) and still maintain a communication with a common core network, such as when a UE leaves a range of access (zone) of a EUTRAN and enters a range of access of a UTRAN or GERAN. Handoffs may also occur between different types of hardware (e.g., different manufacturers, versions, etc.) for a same network type (e.g., EUTRAN, UTRAN, GERAN, etc.). For discussion purposes, it will be assumed that the architecture of FIG. 1 represents a 4G/LTE network that includes one or more evolved Node B's (eNodeB's), represented herein by cell sites 102(1) to 102(N), which provide an interface between a UE, such as a wireless handheld device that is configured to communicate over the radio access network 104(1) to 104(N) and the core network 108. Each eNodeB couples with the core network 108 via the mobility management entity (MME), represented by the intermediary layer 106, which is a control-node.

In accordance with one or more embodiments, other types of networks, RANs, and/or components (hardware and/or software) may be employed that enable telecommunications devices to communicate with the core network 108 to facilitate activities such as voice calling, messaging, emailing, accessing the Internet, or other types of data communications. For example, the wireless telecommunication network 100 may be, at least in part, a Wi-Fi based network, a Bluetooth network, or other type of wireless network.

The wireless telecommunication network 100 may include a central controller 110 to manage network performance optimizations for each cell cite and/or cell site clusters. In some embodiments, the central controller may include a self-organizing network or self-optimizing network (SON) controller. The central controller 110 may be in communication with one or more of the various components of the wireless telecommunication network 100, such as the core network 108, the one or more intermediaries 106, the RANs 104(1) to 104(N), and/or the cell sites 102(1) to 102(N). The central controller 110 may further be configured to send commands to adjust one or more antennas at cell sites 102(1) to 102(N). The antennas may comprise a single antenna, multiple antennas, an array of antennas, a phased antenna array, or the like. The antennas may be mounted to, or otherwise controllable by, an antenna positioner configured to change a beam direction from the antenna by altering a physical position of the antenna or altering the RF characteristics of the antenna.

In one embodiment, the wireless telecommunication network 100 includes a data server 112 that is configured to provide information related to the performance of each cell site individually, clusters of cell sites, or over the entire network. Such information may include, for each cell site, a baseline information of KPI's, historical information regarding the KPI's, trend information of the KPI's, etc. In some embodiments, the data server 112 provides some of the aforementioned information or additional performance information to the central controller 110.

Figure 2:
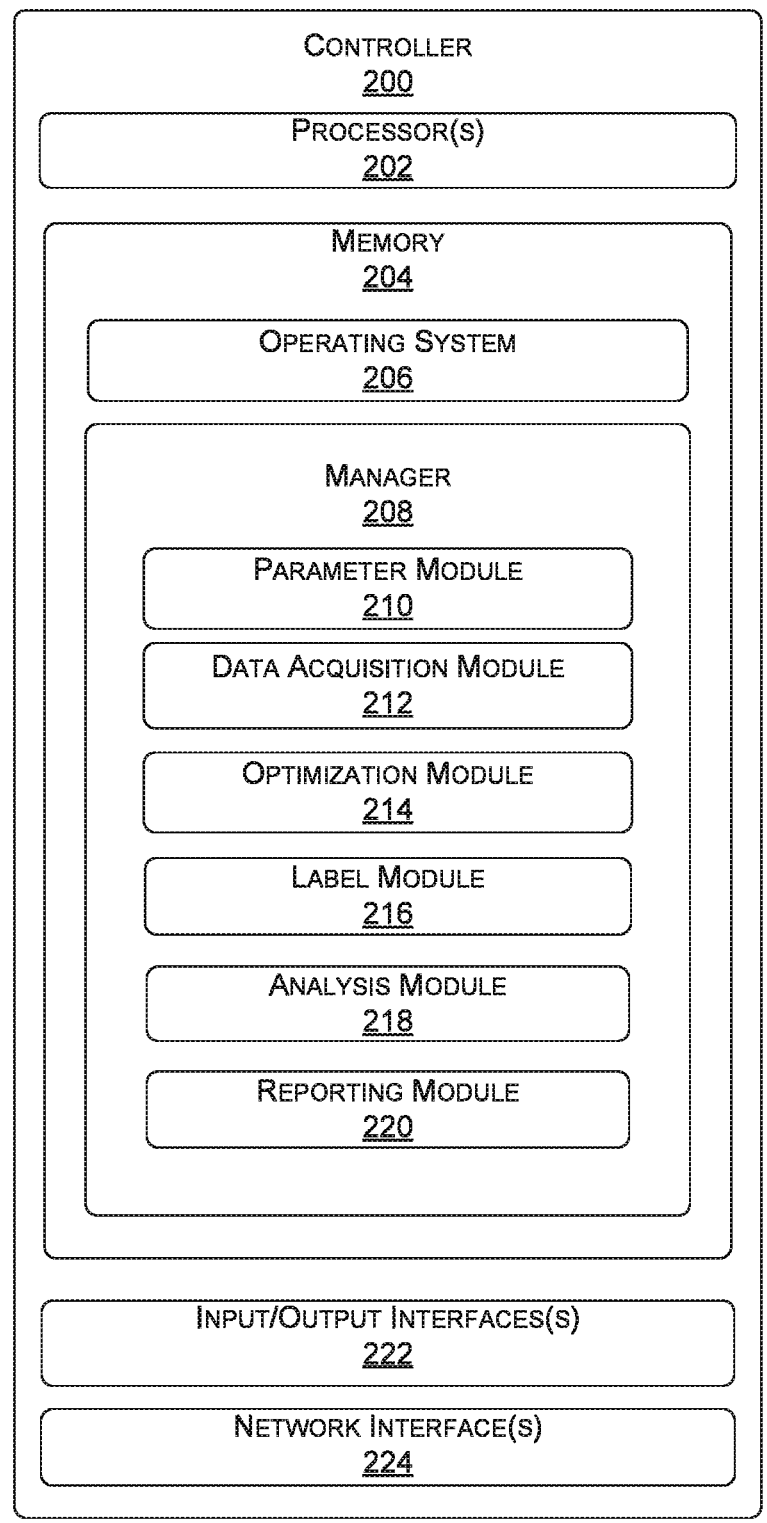
FIG. 2 is a block diagram showing various components of a controller in accordance with various embodiments.

FIG. 2 is a block diagram of an illustrative controller 200 for configuring a network, verifying RET labels, and optimizing performance of cell sites. The controller 200 may be used to implement at least some of the functions of the central controller 110 of FIG. 1. Accordingly, controller 200 may include various modules that perform functions to send commands to RETs for antennas as well as other network elements in order to optimize the performance of cell sites individually or collectively. In some embodiments, the controller 200 also creates and defines groups of cell sites, referred to herein as clusters, adds or assigns cell sites to the clusters, and performs optimizations to the cell sites 102(1) to 102(N) of each cluster to optimize the overall network performance. In various embodiments, the controller 200 may be hosted by one or more servers in a non-distributed configuration (e.g., server farm, etc.) or a distributed configuration (e.g., cloud service, etc.).

The controller 200 may include one or more processors 202 and memory 204 that stores various modules, applications, programs, or other data. The memory 204 may include instructions that, when executed by the one or more processors 202, cause the processors to perform the operations described herein for the controller 200 (e.g., the central controller 110). The memory 204 may include, but is not limited to, non-transitory memory that may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. In some embodiments, the memory 204 may include transitory signals, such as signals that a computer system or machine hosting or running a computer program can be configured to access, including signals downloaded through the Internet or other networks.

In the illustrated example, the memory 204 may include an operating system 206 and various applications, such as a manager 208 that may be used to confirm labels and manage the performance of individual cell sites and/or clusters of cell sites. Execution of the manager 208 by the processor(s) 202 configures the controller 200 to perform various functions. In one embodiment, these functions may be controlled by different modules, such as a parameter module 210, data acquisition module 212, optimization module 214, label module 216, analysis module 218, reporting module 220, etc. The operating system 206 may be used to implement these modules. The operating system 206 may be any operating system capable of managing computer hardware and software resources. The modules discussed herein may include routines, program instructions, objects, and/or data structures that perform particular tasks or implement particular abstract data types.

The parameter module 210 may identify various parameters associated with the cell sites, referred to herein as KPI's. The parameters may include metrics, attributes, or other associated data for each cell site. Some of the parameters may be time-dependent, such as parameters that provide input/output data, service data, performance data (e.g., power used, dropped calls, etc.). Other parameters may not be time dependent, such as location information, software specifications, hardware specifications, network attributes, etc. The parameter module 210 may identify available parameters and, in some instances, identify parameters that impact, drive, or are associated with key result areas to enable a correlation with one or more RETs. The parameter module 210 may also identify parameters that impact, drive, or are associated with key result areas to enable optimization of network performance. In various embodiments, the parameter module 210 may receive input from a data source, such as a server that is configured to provide baseline information for individual cells, clusters of cells, and/or the entire wireless telecommunication network, similar to the data server 112 of FIG. 1. In some embodiments, the parameter module 210 may also receive user input, such as input from an administrator and/or engineer to assist in identification, labeling, or other tasks associated with the parameters.

The data acquisition module 212 may retrieve the parameters from various sources. For example, the data acquisition module 212 may link tables maintained and updated by various servers, such as the data server 112. The acquisition module 212 may compile the parameters over a predetermined period of time. The acquisition module 212 may perform basic operations on the obtained data, such as calculate an average, a mean, a maximum value, a minimum value, and/or perform other calculations using the obtained data. The data acquisition module 212 may also retrieve network attributes from various servers, such as the data server 112, or from individual cell sites 102(1) to 102(N), either directly or through servers such as the data server 112.

The optimization module 214 determines one or more parameters (or network attributes) to optimize (i.e., adjust) for each cell site individually. In some scenarios, the optimization module may be used to optimize one or more parameters of clusters of cell sites. The optimization module 214 may optimize each cell site and/or cluster of cell sites in different ways. For example, the optimization module 214 may increase a value or setting for a first parameter associated with a first cell site and may decrease a value or setting for a second parameter for a second cell site. In some embodiments, the optimization module 214 may make different adjustment based on the values of the parameters or KPI's of a cell site. For example, a first cell site may receive a first adjustment while a second cell sites may receive a second adjustment that is different than the first adjustment. In another example, a first cell site in the first cluster may receive a first adjustment while a second range of cell sites in the first cluster may receive a second adjustment that is different than the first adjustment.

The label module 216 may track and update various elements of the network including antennas that are addressable and adjustable. The label module 216 may update labels as needed and maintain an updated listing of all elements and their corresponding labels. For example, the label module 216 may be configured to access a database of addressable network elements and their corresponding labels and determine a label corresponding to an element that is selected for receiving communications such as a command. The label module 216 may further be configured to update an incorrect label or populate a label when a label is blank.

The analysis module 218 may analyze performance of the cell sites and/or the various components of the wireless telecommunication network 100 following implementation of antenna adjustments and other network changes. In various embodiments, the analysis module 218 may initiate retrieval of data from a data server 112 via the data acquisition module 212. For example, the analysis module 218 may refer to historic data of one or more cell sites to determine a baseline performance of one or more KPI's for the one or more cell sites. To that end, the analysis module 218 triggers the data acquisition module to interact with the data server 112 to retrieve stored historical data regarding the relevant one or more cell sites.

The reporting module 220 may report results of the performance of the cell sites and/or the various components of the wireless telecommunication network 100 following implementation of the optimization. The reporting module 220 may be used to trigger a subsequent refreshing of the optimizations, or other tasks performed by the optimization manager 208 at predetermined intervals or upon a trigger event.

In the illustrated example, the controller 200 may further include input/output interface(s) 222. The input/output interface(s) 222 may include any type of output interface known in the art, such as a display (e.g., a liquid crystal display), speakers, a vibrating mechanism, or a tactile feedback mechanism. Input/output interface(s) 222 also include ports for one or more peripheral devices, such as headphones, peripheral speakers, or a peripheral display. Further, the input/output interface(s) 222 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

In the illustrated example, the controller 200 may further include one or more network interface(s) 224. The one or more network interface(s) 224 may include any sort of transceiver known in the art. For example, the one or more network interface(s) 224 may include a radio transceiver that performs the function of transmitting and receiving radio frequency communications via an antenna. In addition, the one or more network interface(s) 224 may also include a wireless communication transceiver and a near field antenna for communicating over unlicensed wireless Internet Protocol (IP) networks, such as local wireless data networks and personal area networks (e.g., Bluetooth or near field communication (NFC) networks). Further, the one or more network interface(s) 224 may include wired communication components, such as an Ethernet port or a Universal Serial Bus (USB).

Figure 3:
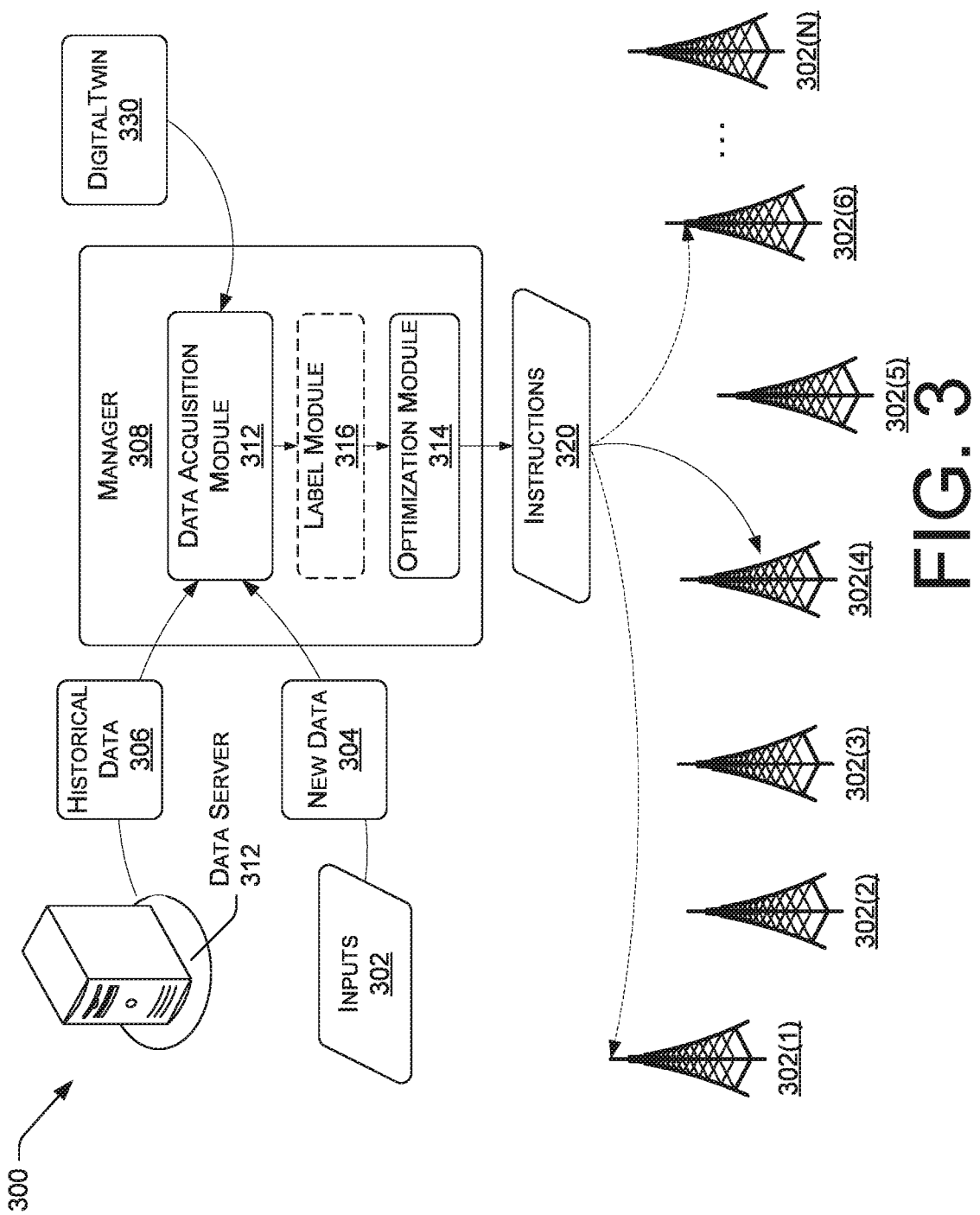
FIG. 3 is a diagram that shows an example architecture for implementing a wireless network system according to some embodiments.

Reference now is made to FIG. 3, which illustrates an example schematic diagram of a computing architecture 300 that can be used to perform various functions described herein, including automatically adjusting a RET. The architecture 300 may include a manager 308. For illustrative purposes, the manager 308 includes the data acquisition module 312, the label module 316, and the optimization module 314, although the manager 308 may include other modules or data. Computing architecture 300 may also include a digital twin 330 that includes a representation of the network that can be run in parallel with the physical network.

In accordance with various embodiments, the data acquisition module 212 may receive data from various data sources represented herein by data server 312. The data sources may include historical data 306 related to hardware, services, or other related data. In some instances, the historical data 306 may be located in separate tables, locations, and/or may be controlled or managed by other entities. For example, the historical data 306 may include customer survey information collected by a third party.

The data acquisition module 312 receives the historical data 306 from the data server 312 and provides the data to the label module 316 for association with elements at respective cell sites. The data acquisition module 312 may perform analysis of the data.

In various embodiments, the label module 316 may receive the data from the data acquisition module 312 and input 302. The input 302 may include data associated with the cell sites such as, and without limitation, an area of the radio network controller, baseline dates (time period), metrics, thresholds for the metrics, and/or other associated data, represented collectively as new data 304 in the example of FIG. 3.

In response to receiving the relevant data from the data server 312 and/or the input 302, the manager 308 may provide the gathered historical data 306 and the new data 304 to the label module 316 to determine correlations between the data and adjusted RETs. The manager 308 may also provide the gathered historical data 306 and the new data 304 to the optimization module 314 to optimize the performance of a cell site. In one example, the optimization performed by the optimization module 314 may be with respect with an individual cell site (e.g., 302(4)) or a cluster (e.g., 302(10, 302(4) and 302(6)). For example, the optimization module 314 may receive data directly from the data acquisition module 312, and data from the label module 316 with information regarding the elements that were adjusted. The optimization module 314 may perform the optimization to create instructions 320, which may be deployed to a cell site individually or to a cluster. The instructions 320 may include parameter changes, implementation instructions, scripts to perform the changes, and/or other data to deploy the optimization for each cell site individually or in aggregate (i.e., group) for a cluster.

Figure 4:
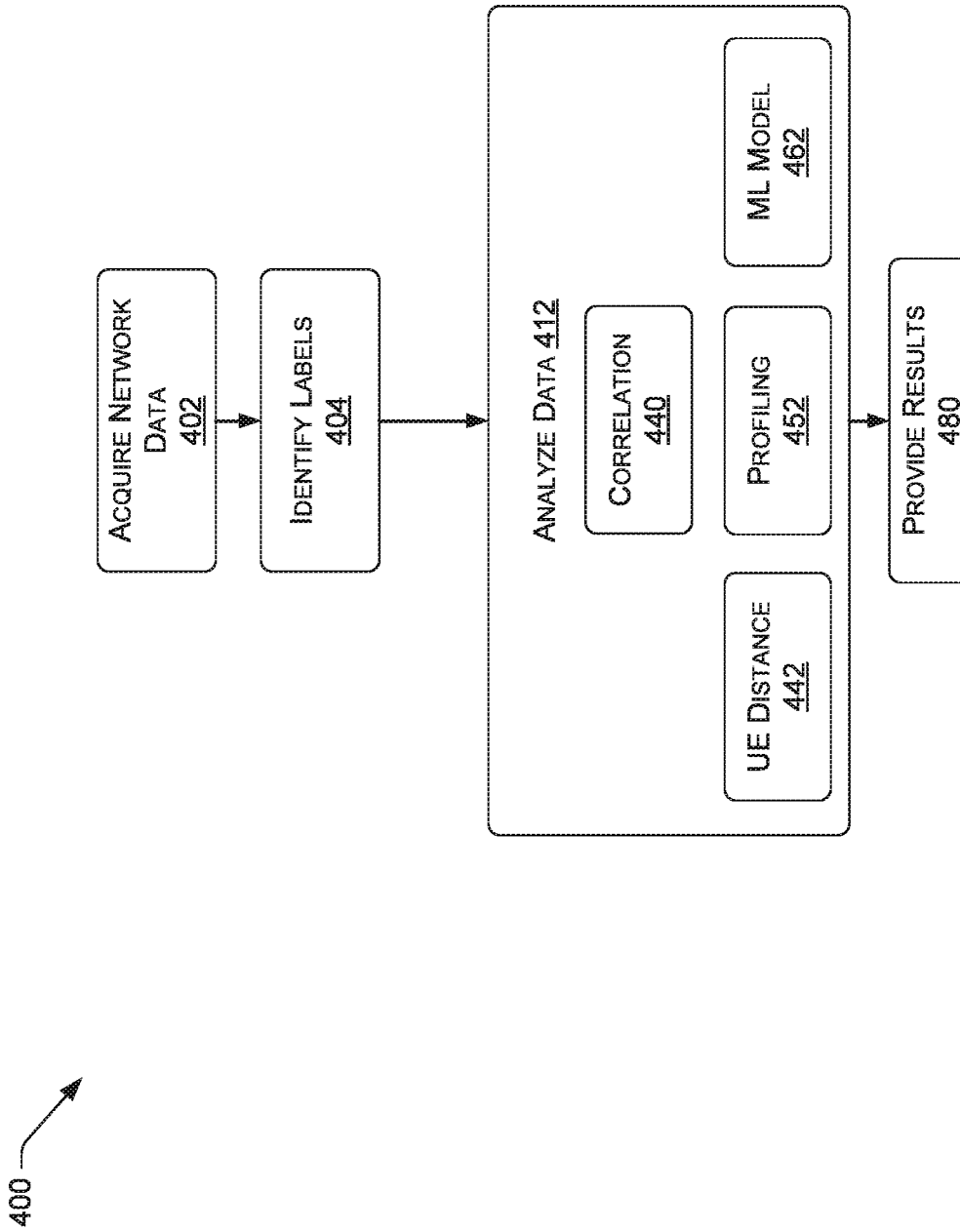
FIG. 4 is a flow diagram of an example process according to some embodiments.
Figure 5:
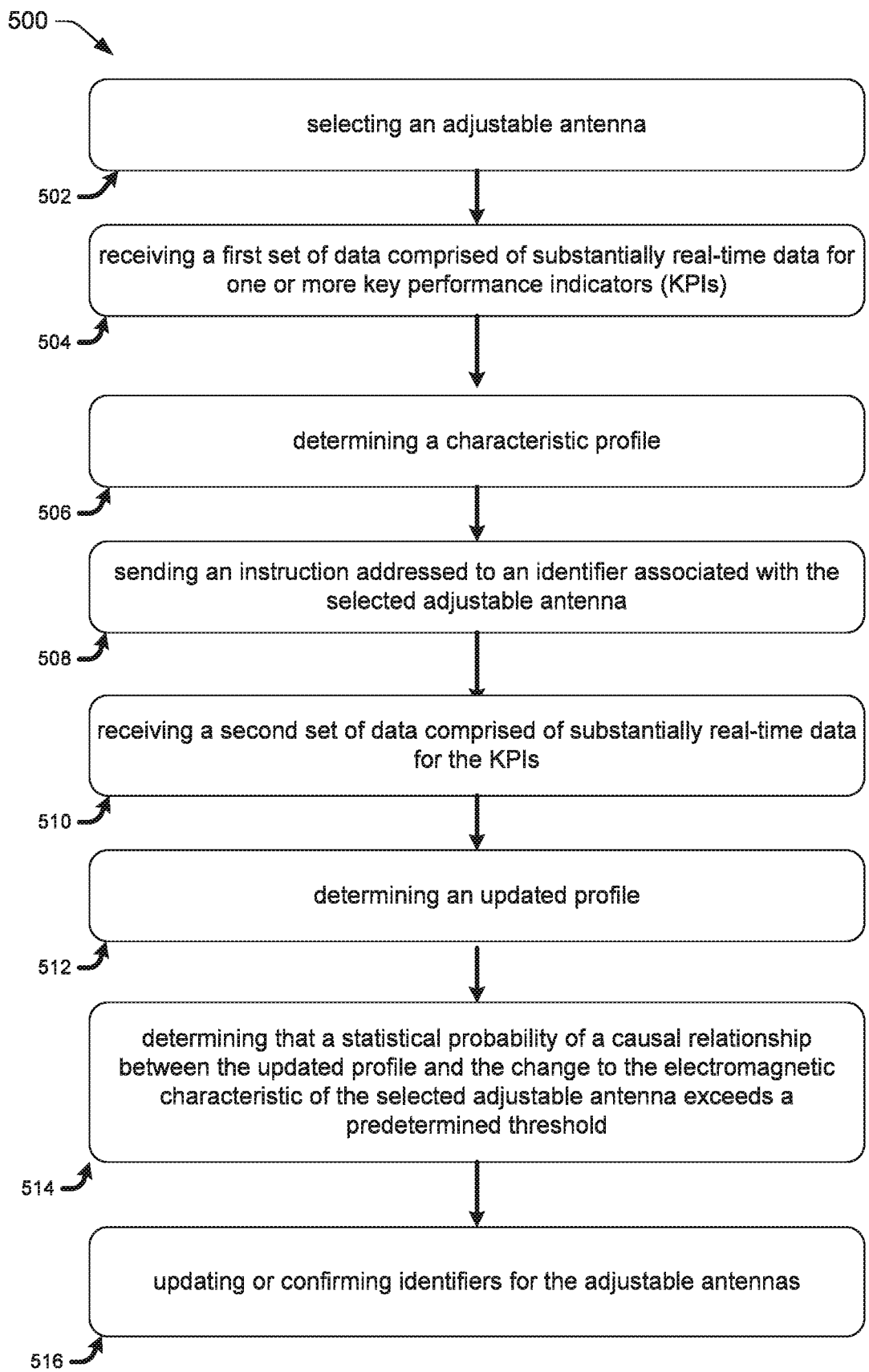
FIG. 5 is a flow diagram of an example process according to some embodiments.

With the foregoing overview of an example network 100 that facilitates the adjusting of one or more parameters of a cell site or a cluster of cell sites of FIG. 1, it may be helpful to provide some example processes. To that end, FIGS. 4 to 5 illustrate flow diagrams of example processes to verify the labeling of elements and optimize the performance of a wireless telecommunication network. The processes are illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. For discussion purposes, the process 400 and 500 are described with reference to the architecture 100 of FIG. 1, the controller 200 of FIG. 2, and the computing architecture of FIG. 3.

The process 400 may be performed by manager 208 of a central controller 110 of a wireless telecommunication network 100. At block 402, the data acquisition module 312 of the controller 200 may receive historical data 306 and new data 304 from various sources, such as inputs 302 and the data server 312 of FIG. 3. The historical data 306 and/or the new data 304 can be used to create a baseline performance of each cell site. In one embodiment, the baseline performance may be based on KPI's of each individual cell site that have been stored in the data server 312 to indicate an average expected operation of the respective cell site for each KPI. In other embodiments, the KPI's may be based on new data 304, which is used to identify average KPI's for all cell sites or cell sites that were grouped together. In other embodiments, the KPI's are based on predetermined values that may have been programmed by an administrator of the wireless telecommunication network 100.

At block 404, the manager 308 identifies elements (e.g., antennas) to adjust and their currently known labels. At block 412, the manager 308 may apply one or more instructions to analyze and/or modify various aspects of the identified elements.

In various situations, one or more modules may be used to acquire additional data, analyze the data, and determine if any labels need to be corrected. At block 480, the results may be provided to allow the updates to be stored in a data store, such as in a database of the controller 200. Various analytical methods may be used to determine correlations between KPIs and adjusted elements such as antennas. In one embodiment, a correlation function 440 may be implemented. In one embodiment, an algorithm may be used for determining correlations between observed data and adjusted antennas. In an embodiment, the median and standard deviation may be determined for a predetermined time period. In one example, the median of a time period may be determined for the day that the element was adjusted. The difference between the median of the date of change and the median of the predetermined time period may be determined, which may be divided by the standard deviation to find a multiple of the standard deviation. A cell with the highest multiple of the standard deviation may be identified as the cell with the largest change. In other embodiments, other algorithms may be used to determine correlations between observed data and adjusted antennas. To reduce computational requirements, heuristic methods may be used to converge more quickly to solutions.

In some embodiments, various functions may be implemented such as modules for analyzing UE distance 442 and determining characteristic profiles 452. For example, the module for analyzing UE distance 442 may be configured to measure the distance of traffic from a cell site, which can be used to provide a statistically indicative measure of change due to a RET tilt. The module for determining characteristic profiles 452 may be configured to determine a profile associated with one or more network elements that have been perturbed in some controlled manner, and one or more KPIs that have been collected after the perturbation. The profile may be determined based on statistical information, which may include any combination of confidence scores, variance metrics, central tendency values, probability distribution functions, and the like. The profile may also be determined based on time-distributed data. In one example, a sample distribution may be determined based on a number of KPI samples collected over a predetermined time period.

In some embodiments, a machine learning model 462 may be implemented to update determine correlations. In some configurations, the machine learning model may be configured to utilize supervised, unsupervised, or reinforcement learning techniques to generate correlations. For example, the machine learning model may utilize supervised machine learning techniques by training on the collected KPI data. In some embodiments, the machine learning model may also, or alternatively, utilize unsupervised machine learning techniques to determine correlations including, but not limited to, a clustering-based model, a forecasting-based model, a smoothing-based model, or another type of unsupervised machine learning model. In some embodiments, the machine learning model may also, or alternately, utilize reinforcement learning techniques to generate results. For example, the model may be trained using the input data and, based on feedback, the model may be rewarded based on its output.

In some embodiments, the KPI data may be analyzed to identify trends and patterns related to correlations. In one embodiment, the machine learning model may incorporate a classification function that may be configured to continuously learn which data are relevant to various potential outcomes.

In some embodiments, an algorithm, such as a feature subset selection algorithm or an induction algorithm, may be implemented to define groupings or categories. One or more estimation methods may be incorporated, such as a parametric classification technique. In various embodiments, the machine learning model may employ a combination of probabilistic and heuristic methods to guide and narrow the data that are analyzed.

FIG. 5 is a flow diagram of an illustrative process 500 for implementing some of the techniques disclosed herein. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

The routine 500 begins at operation 502, which illustrates selecting an adjustable antenna of a cellular telecommunication network comprising a plurality of base stations and adjustable antennas.

The routine 500 then proceeds to operation 504, which illustrates receiving a first set of data comprised of substantially real-time data for a one or more KPIs.

Operation 506 illustrates, based at least on the first set of data, determining a characteristic profile.

Operation 508 illustrates sending an instruction addressed to an identifier associated with the selected adjustable antenna, the instruction indicative of a command to change an electromagnetic characteristic of the selected adjustable antenna.

Operation 510 illustrates receiving a second set of data comprised of substantially real-time data for the one or more KPIs.

Operation 512 illustrates, based at least on the second set of data, determining an updated profile for the one or more KPIs.

Operation 514 illustrates, based on a comparison of the characteristic profile and the updated profile, determining that a statistical probability of a causal relationship between the updated profile and the change to the electromagnetic characteristic of the selected adjustable antenna exceeds a predetermined threshold.

Operation 516 illustrates, in response to determining that the statistical probability of the causal relationship exceeds the predetermined threshold, updating or confirming identifiers for the adjustable antennas. In an embodiment, this enables subsequent changes to the cellular telecommunication network using the updated or confirmed identifiers.

In an embodiment, an instruction is sent to a SON controller to reconfigure the cellular telecommunication network based on the causal relationship. In some embodiments, the SON updates the identifier. In further embodiments, the SON sends a second instruction addressed to the identifier associated with a selected adjustable antenna. Additionally or optionally, the SON sends a second instruction addressed to an identifier associated with a different adjustable antenna.

In an embodiment, a digitally twinned emulation of the cellular telecommunication network is stored. The emulation may comprise virtual representations of the plurality of base stations, adjustable antennas of the cellular telecommunication network, and associated KPI values. The second set of data and an emulated set of data for the one or more KPIs as modeled by the emulation may be compared. Based on the comparing, it may be determined that the identifier associated with the selected adjustable antenna was incorrect.

In an embodiment, the command may be to up-tilt or down-tilt a RET. In some embodiments, the KPIs comprise one or more of Average UE Distance, PRACH Propagation Distance, or Average Timing Advance.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

It is understood that any specific order or hierarchy of steps in the process disclosed in FIGS. 4 and 5 are illustrations of exemplary approaches. Based upon design preferences, it is understood that the specific order or hierarchy of blocks in the processes may be rearranged, expanded, and some steps omitted. Some of the blocks may be performed simultaneously. For example, the action of load balancing and optimization of cellular coverage of FIG. 5 may occur concurrently or may be omitted.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The claims, description, and drawings of this application may describe one or more of the instant technologies in operational/functional language, for example, as a set of operations to be performed by a computer. Such operational/functional description in most instances can be specifically-configured hardware (e.g., because a general purpose computer in effect becomes a special purpose computer once it is programmed to perform particular functions pursuant to instructions from program software).

Although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language is to be read in its proper technological context, i.e., as concrete specifications for physical implementations.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of configuring a self-organizing network (SON) of a cellular telecommunication network, the cellular telecommunication network comprising a plurality of base stations and adjustable antennas, the method comprising:
   selecting an adjustable antenna at a base station of the cellular telecommunication network;
   receiving a first set of data comprised of substantially real-time data for one or more key performance indicators (KPIs) of one or more base stations;
   based at least on the first set of data, determining a characteristic profile of the one or more KPIs;
   sending an instruction addressed to an identifier associated with the selected adjustable antenna, the instruction indicative of a command to change an electromagnetic characteristic of the selected adjustable antenna;
   receiving a second set of data comprised of substantially real-time data for the one or more KPIs;
   based at least on the second set of data, determining an updated profile for the one or more KPIs;
   based on a comparison of the characteristic profile and the updated profile, determining whether a statistical probability of a causal relationship between the updated profile and the change to the electromagnetic characteristic of the selected adjustable antenna exceeds a predetermined threshold;
   in response to the statistical probability of the causal relationship exceeding the predetermined threshold, determining that the identifier is confirmed as a confirmed identifier for the selected adjustable antenna; and
   in response to the statistical probability of the causal relationship not exceeding the predetermined threshold, updating the selected adjustable antenna with an updated identifier following an identification of the updated identifier for the selectable adjustable antenna, thereby enabling subsequent changes to the cellular telecommunication network using the updated identifier or the confirmed identifier.

2. The method of claim 1, further comprising sending an instruction to a SON controller to reconfigure the cellular telecommunication network based on the causal relationship using the updated identifier or the confirmed identifier.

3. The method of claim 2, wherein the SON sends a second instruction addressed to an additional identifier associated with a different adjustable antenna.

4. The method of claim 2, wherein the SON sends a second instruction addressed to the identifier associated with the selected adjustable antenna.

5. The method of claim 1, wherein the command is to up-tilt or down-tilt a Remote Electrical Tilt (RET) of the selected adjustable antenna.

6. The method of claim 1, further comprising:
   storing a digitally twinned emulation of the cellular telecommunication network, the emulation comprising virtual representations of the plurality of base stations, adjustable antennas of the cellular telecommunication network, associated KPI values of the base station, and the change to the electromagnetic characteristic of the selected adjustable antenna;
   comparing the second set of data and an emulated set of data for the one or more KPIs as modeled by the emulation; and
   in response to a disparity between the second set of data and the emulated set of data, determining that the identifier is incorrectly associated with the selected adjustable antenna.

7. A computing device configured to administer a wireless telecommunication network (WTN) having a plurality of cell sites, the computing device comprising:
   a processor;
   a network interface communicatively coupled to the processor and configured to enable communications with the WTN;
   a storage device coupled to the processor;
   an application stored in the storage device, wherein execution of the application by the processor configures the computing device to perform acts comprising:
   selecting an adjustable antenna at a cell site of the WTN;
   receiving a first set of data comprised of substantially real-time data for one or more key performance indicators (KPIs) of the plurality of cell sites;
   based at least on the first set of data, determining a characteristic profile for the one or more KPIs;
   sending an instruction addressed to an identifier associated with a selected adjustable antenna of the WTN, the instruction indicative of a command to change an electromagnetic characteristic of the selected adjustable antenna;
   receiving a second set of data comprised of substantially real-time data for the one or more KPIs of the plurality of cell sites;
   based at least on the second set of data, determining an updated profile for the one or more KPIs;
   based on a comparison of the characteristic profile and the updated profile, determining whether a statistical probability of a causal relationship between the updated profile and the change to the electromagnetic characteristic of the selected adjustable antenna exceeds a predetermined threshold; and
   in response to the statistical probability of the causal relationship exceeding the predetermined threshold, determining that the identifier is confirmed as a confirmed identifier for the selected adjustable antenna; and
   in response to the statistical probability of the causal relationship not exceeding the predetermined threshold, updating the selected adjustable antenna with an updated identifier following an identification of the updated identifier for the selectable adjustable antenna, thereby enabling subsequent changes to the WTN using the updated identifier or the confirmed identifier.

8. The computing device of claim 7, wherein receiving the first set of data comprises:
   extracting KPIs over a predetermined time period; and
   determining an average value for the KPIs for the predetermined time period.

9. The computing device of claim 7, wherein receiving the first set of data comprises:
   extracting KPIs of the plurality of cell sites; and
   determining an average value for the KPIs based on the plurality of cell sites.

10. The computing device of claim 7, wherein the command is to up-tilt or down-tilt a RET.

11. The computing device of claim 7, wherein the KPIs comprise one or more of Average UE Distance, PRACH Propagation Distance, or Average Timing Advance.

12. The computing device of claim 7, wherein a median and standard deviation for a predetermined time period is used for the determining the statistical probability.

13. A non-transitory computer-readable medium having stored thereon a plurality of sequences of instructions which, when executed by a processor, cause the processor to perform a method comprising:
receiving a first set of data comprised of substantially real-time data for one or more key performance indicators (KPIs) for a cellular telecommunication network comprising a plurality of base stations and adjustable antennas of the cellular telecommunication network;
based at least on the first set of data, determining a characteristic profile of the one or more KPIs;
sending a command to an identifier associated with a selected adjustable antenna of the cellular telecommunication network, the command for changing an electromagnetic characteristic of the selected adjustable antenna;
receiving a second set of data comprised of substantially real-time data for the one or more KPIs;
based at least on the second set of data, determining an updated profile of the one or more KPIs;
based on the updated profile, determining a causal relationship exists between the updated profile and the change to the electromagnetic characteristic of the selected adjustable antenna;
in response to determining the causal relationship exists, determining that the identifier is confirmed as a confirmed identifier for the selected adjustable antenna; and
in response to determining the causal relationship does not exist, updating the selected adjustable antenna with an updated identifier following an identification of the updated identifier for the selectable adjustable antenna, thereby enabling subsequent changes to the cellular telecommunication network using the updated identifier or the confirmed identifier.

14. The non-transitory computer-readable medium of claim 13, the method further comprising sending an instruction to a SON controller to reconfigure the cellular telecommunication network based on the causal relationship using the updated identifier or the confirmed identifier.

15. The non-transitory computer-readable medium of claim 14, wherein reconfiguring the cellular telecommunication network comprises sending a second instruction addressed to an additional identifier associated with a different adjustable antenna.

16. The non-transitory computer-readable medium of claim 14, wherein reconfiguring the cellular telecommunication network comprises sending a second instruction addressed to the identifier associated with the selected adjustable antenna.

17. The non-transitory computer-readable medium of claim 13, wherein the command is to up-tilt or down-tilt a Remote Electrical Tilt (RET) of the selected adjustable antenna.

18. The non-transitory computer-readable medium of claim 13, further comprising:
storing a digitally twinned emulation of the cellular telecommunication network, the emulation comprising virtual representations of the plurality of base stations, adjustable antennas of the cellular telecommunication network, associated KPI values of the cellular telecommunication network, and the change to the electromagnetic characteristic of the selected adjustable antenna;
comparing the second set of data and an emulated set of data for the one or more KPIs as modeled by the emulation; and
based on the comparing, determining that the identifier associated with the selected adjustable antenna of the cellular telecommunication network was incorrect.

19. The non-transitory computer-readable medium of claim 13, wherein the KPIs comprise one or more of Average UE Distance, PRACH Propagation Distance, or Average Timing Advance.

20. The non-transitory computer-readable medium of claim 13, wherein a median and standard deviation for a predetermined time period is used for the determining the causal relationship.

* * * * *